US008108247B2

(12) United States Patent
Klassen

(10) Patent No.: US 8,108,247 B2
(45) Date of Patent: Jan. 31, 2012

(54) TONER ESTIMATOR AND REPORTER

(75) Inventor: R. Victor Klassen, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 522 days.

(21) Appl. No.: 12/332,732

(22) Filed: Dec. 11, 2008

(65) Prior Publication Data

US 2010/0153145 A1 Jun. 17, 2010

(51) Int. Cl.
*G06Q 10/00* (2006.01)

(52) U.S. Cl. ...................................................... 705/7.35

(58) Field of Classification Search ........................ None
See application file for complete search history.

(56) References Cited

U.S. PATENT DOCUMENTS

| | | | | |
|---|---|---|---|---|
| 5,204,699 A | 4/1993 | Birnbaum et al. | | |
| 5,383,129 A | 1/1995 | Farrell | | |
| 6,356,359 B1 | 3/2002 | Motamed | | |
| 7,124,094 B1 * | 10/2006 | Kobayashi et al. | ............ | 705/64 |
| 7,359,088 B2 | 4/2008 | Clark et al. | | |
| 2002/0041394 A1 * | 4/2002 | Aoki | ........................... | 358/1.15 |
| 2007/0159647 A1 * | 7/2007 | Carling et al. | .............. | 358/1.12 |
| 2008/0075480 A1 | 3/2008 | Konishi et al. | | |

OTHER PUBLICATIONS

"Don't underestimate your estimator", Don Merit, American Printer v214n6 Mar. 1995.*

"The cost per page.", Government Computer News, v18, n17, p. 2, Jun. 14, 1999.*

* cited by examiner

*Primary Examiner* — Rutao Wu

(74) *Attorney, Agent, or Firm* — Fay Sharpe LLP

(57) ABSTRACT

Systems and methods are described that facilitate presenting estimated toner consumption for a print job to a user. A print job is identified from a print job queue or by a job ticket, and is analyzed to identify print job parameters such as rendering mode, resolution, pages in the job, etc. A user may adjust rendering resolution and/or a job sub-setting such as a page cycle value or multiple thereof (e.g., where every Nth page of the job is the same or similar). Raster image processing is performed on the print job (with or without printing the job) to generate rasters, and a lookup table is accessed to identify an amount of toner required for each page given the rasters generated therefor at the given resolution in the given rendering mode. Toner cost estimation information is summarized in a report that is presented to the user (e.g., on a GUI, a printed page, or via electronic transfer).

20 Claims, 2 Drawing Sheets

TONER ESTIMATOR AND REPORTER

CROSS-REFERENCE TO RELATED APPLICATIONS

The subject application contains subject matter related to U.S. patent application Ser. No. 12/332,657 filed on Dec. 11, 2008, entitled "TONER CONSUMPTION CALCULATION FOR PRINTER WITH MULTIPLE INTERACTING SEPARATIONS," and filed concurrently herewith, the entirety of which is incorporated by reference herein.

BACKGROUND

The subject application relates to toner estimation and reporting for a printing device. While the systems and methods described herein relate toner estimation, it will be appreciated that the described techniques may find application in other resource cost estimation systems, other resource consumption reporting applications, and/or other printing systems.

Users of a printer can benefit from being able to estimate the amount of toner needed for a given print a job, before the job is printed. Such information is useful for billing purposes and cost estimation, and for large jobs it is useful for inventory control. Because the amount consumed is highly printer specific, and depends on the job content, estimates based on page count are inaccurate. Classical methods for estimating tone consumption use the entire print job, which may be very computationally expensive, particularly since jobs for which estimates are needed tend to be long jobs. Such methods describe the calculation without reference to how the user might select the calculation or how the resulting information is presented. Information of toner consumption is useful even to users operating on a pure click-charge basis, so that they may be able to pre-order materials in advance of a large job.

For example, U.S. Pat. No. 5,204,699 addresses converting from bit coverage to material consumption in the single separation case. U.S. Pat. No. 5,383,129 addresses taking computed materials and converts to costs and/or prices. U.S. Pat. No. 6,356,359 addresses using a reduced resolution image. U.S. Pat. Nos. 5,604,578 and 5,592,298 relate to taking a subset of image pixels to compute the coverage statistically. U.S. Pat. No. 7,359,088 relates to printing, scanning, and estimating the coverage from the scan, calculating the coverage from the bitmap, and printing the calculated result on the document. US Application 2008/0075480 A1 addresses a model of halftone dot growth to predict toner consumption. However, all of these techniques are susceptible to inaccuracies when dealing with interacting color separations.

Accordingly, there is an unmet need for systems and/or methods that facilitate estimating and reporting toner consumption for a printer to a user, while overcoming the aforementioned deficiencies.

BRIEF DESCRIPTION

In accordance with various aspects described herein, systems and methods are described that facilitate estimating and reporting toner consumption in a printing engine to a user. For example, a method of estimating toner consumption by a printer comprises identifying a print job for which toner cost estimation is desired, analyzing the selected print job to identify print job parameters, and performing raster image processing on the print job as a function of the identified print job parameters. The method further comprises estimating toner cost for the print job as a function of raster information generated during raster image processing, summarizing toner cost estimation information in a toner cost estimation report, and presenting the report to a user.

According to another feature described herein, a toner cost estimation system comprises a memory that stores computer-executable instructions for: identifying a print job for which toner cost estimation is desired, from one or more of a print job queue and a job ticket; analyzing the selected print job to identify print job parameters; performing raster image processing on the print job as a function of the identified print job parameters; and estimating per-page toner cost for the print job as a function of raster information generated during raster image processing. The instructions further comprises summarizing the toner cost estimation in a toner cost estimation report, and presenting the report to a user. The system further comprises a processor that executes the instructions, and a graphical user interface (GUI) whereby information is presented to a user.

Yet another feature relates to an apparatus for estimating toner cost for a print job, comprising means for identifying a print job for which toner cost estimation is desired, means for analyzing the selected print job to identify print job parameters including rendering resolution, rendering mode, and number of pages in the print job, and means for performing raster image processing on the print job to generate raster information as a function of the identified print job parameters. The apparatus further comprises means for estimating toner cost on a per page basis for the print job as a function of the raster information, means for summarizing toner cost estimation information in a toner cost estimation report, and means for presenting the report to a user.

DETAILED DESCRIPTION

In accordance with various features described herein, systems and methods are described that facilitate estimating toner usage for a printing device and reporting toner consumption estimates for a user.

Figure 1:
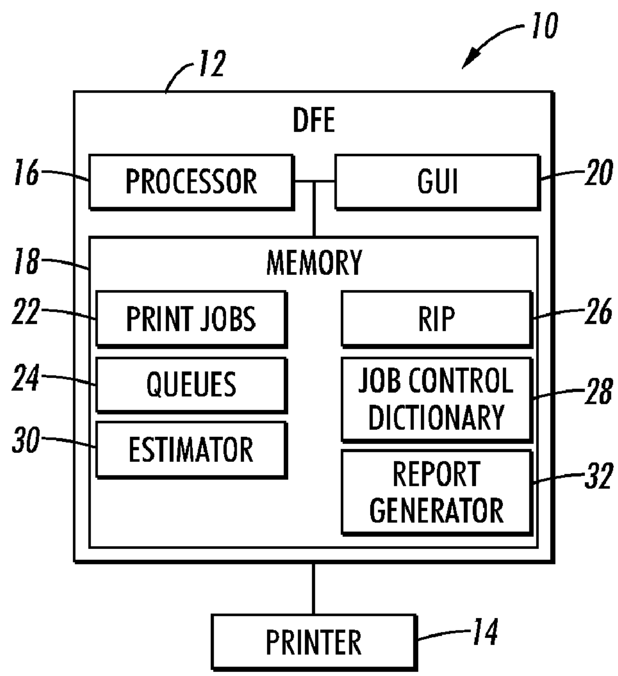
FIG. 1 illustrates a toner consumption estimation system that facilitates estimating an amount of toner consumed by a printer for one or more print jobs in order to track toner costs and accurately estimate print job costs, in accordance with various aspects described herein.

With reference to FIG. 1, a toner consumption estimation system 10 is illustrated that facilitates estimating an amount of toner consumed by a printer for one or more print jobs in order to track toner costs and accurately estimate print job costs, in accordance with various aspects described herein. The system 10 comprises a digital front end (DFE) 12 that is coupled to a printer 14. For example, the DFE may be a DocuSP™ DFE, also called a Freeflow™ Print Server, which includes several features that may be used in conjunction with the described embodiments. First, it provides multiple job queues with queue properties. Second, it provides job tickets, which can be used to override queue properties that control the disposition of a job. The job tickets allow a user to temporarily set queue properties on a per-job basis, so that the necessary properties can be changed from a user's work station. Queue properties that make the described embodiments particularly useful in the context of DocuSP™ or similar systems are the ability to select job subsets, and select color rendering modes.

The DFE 12 comprises a processor 16 that executes, and a memory 18 that stores, computer-executable instructions for carrying out the various procedures and performing the various functions described herein. The system further includes a graphical user interface (GUI) 20 that provides user input to the processor 16 and/or memory 18, and displays information to a user.

The memory stores one or more print jobs 22, optionally in one or more queues 24. To generate a toner cost estimation report for a user, the user indicates (e.g., either at the queue level or via a job ticket) that a job is to have its toner consumption estimated. All queue properties for the print jobs 22 in the queue(s) 24 are retained as though for printing, with the optional exceptions of resolution, and job sub-setting. If the user knows that the job has, for example, a 5 page cycle (i.e., every fifth page is similar in coverage), the user may select (e.g., via the GUI 20) a subset having a multiple of five pages. The user may choose to print the job at this time or at a later time, since toner consumption estimation can be performed with or without printing.

The selected job passes through the queuing system 24 and a raster image processing (RIP) algorithm 26 (e.g., a set of computer-executable instructions) is executed on pages in the job. Additionally, a job control dictionary 28 is consulted (e.g., a table lookup or the like is performed by the processor) to verify that toner cost estimation has been selected by the user.

The processor 16 executes an estimation algorithm 30 to estimate a cost (e.g., toner consumption) for the job based on the rasters generated by the RIP 26. The rasters are computed in device color space, as determined by the current rendering mode listed in the queue properties. Estimates are generated on a page by page basis. For example, raster image processing is performed or simulated at a selected resolution, which may be a function of the rendering mode(s) for the page(s) in the print job. Different rendering modes are employed for various image objects (e.g., photographs, graphics, business graphics, text etc.), and toner consumption for each rendering mode can be determined based on the rasters, the rendering mode, and the resolution of the image(s). In one example, a table lookup is performed to determine an amount of toner consumed when printing the rasters generated or simulated during raster image processing in a given rendering mode at a given resolution, and a cost function is applied to estimate the toner cost of the print job.

The processor optionally executes a toner cost report generation algorithm 32 to generate a cost estimate report, and toner cost estimation information is presented to the user via the GUI 20. For example, a single summary or report of the entire job is presented giving one or more of pages, toner, and/or binding material consumed. In another example, the information for each page is presented on a page by page basis. In another example, the information for representative pages is presented. The information is displayed on a the GUI 20, printed on a sheet of paper by the printer 14, transmitted electronically or wirelessly to a device (e.g., a PC, laptop, cell phone, smartphone, PDA, workstation, or personal communication device etc.) of the user's choosing, etc.

When page-by-page or representative-page toner cost estimation is used, the information for each page is displayed by page number(s) or as thumbnails of the pages themselves. If the estimation information is transmitted electronically to the user, it may be in a form readily converted to a spreadsheet or added to a database.

In the case of representative pages, the cost estimates for all of the pages for each of the color separations (e.g., C, M, Y, and K; R, G, B, and W, etc.) are calculated, and cluster analysis is performed, either on the overall page cost or on the per-separation page cost. A cluster has associated with it all of the pages (page numbers and/or images) that have a similar cost. The report includes either a thumbnail of a representative page from each cluster along with the cost per page and number of pages in that cluster, or the page number of a representative page along with the cost per page a number of pages. This information is either printed or converted to a viewable form such as PDF and stored in the memory 18 or transmitted to the user. Typical jobs have few enough clusters that recognizable thumbnails along with the pertinent cost information can be printed on one page.

Cluster analysis, as commonly known, is the classification of objects into different groups, or more precisely, the partitioning of a data set into subsets (clusters), so that the data in each subset (ideally) share some common trait—often proximity according to some defined distance measure. In the case where page costs are being analysed, cluster analysis might comprise separating page costs so that all page costs in a cluster are within a predetermined amount of each other, or it could use an adaptive technique, wherein the size of the clusters depends on the variance of the data within and/or between clusters.

In one embodiment, toner estimation is provided as a queue property on DocuSP™ and/or Free Flow Print Service™. This allows the customer to calculate an estimate for job subsets, which are supported as a queue property, and for various rendering modes (also queue properties). A rasterized job may be automatically discarded, or the entire job could be prepared in a RIP and Save mode. The resulting estimate can be displayed on the GUI, printed, or electronically stored or transmitted for further viewing or processing. Estimates contained in the cost estimate report may be provided for an entire job or on a page by page basis.

Figure 2:
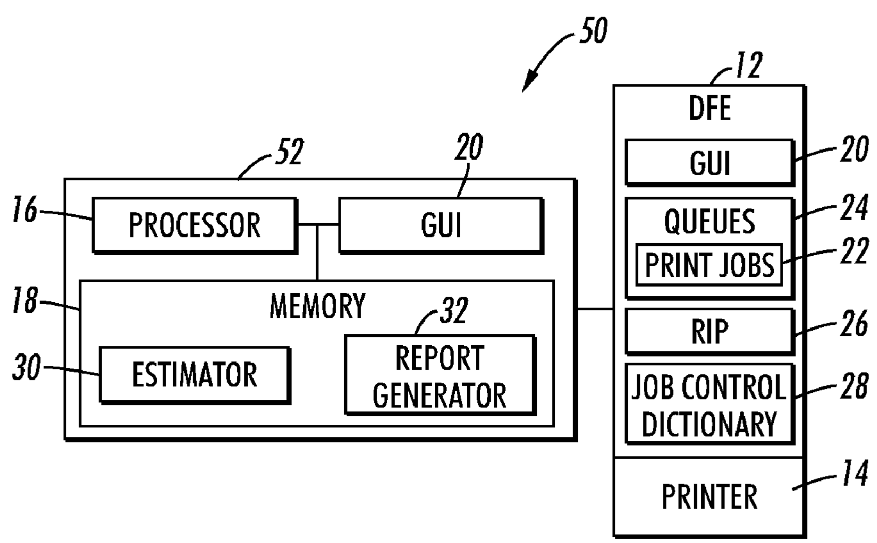
FIG. 2 illustrates a system in which a toner estimation component or module is external to a digital front end (DFE), in accordance with various aspects described herein.

FIG. 2 illustrates a system 50 in which a toner estimation component or module 52 is external to the DFE 12, in accordance with various aspects described herein. For instance, the toner estimation component 52 may be a module that is coupled to the DFE 12 as an after-market add-on or the like, to provide back-portability for print engines 14 and/or DFEs 12 manufactured without an integral toner estimation component 52. Accordingly, the toner estimation component 52 includes a processor 16, memory 18, and optionally a GUI 20. The memory 18 stores computer-executable instructions that are executed by the processor 16. For instance, the memory 18 stores a toner cost estimation algorithm 30 that estimates toner cost, and a report generation algorithm that organizes toner cost estimation information into a summary or other output format for presentation to a user via the GUI 20.

The DFE 12 comprises a GUI that presents information related to print jobs, toner cost estimation and the like to a user. It will be appreciated that the GUI 20 may be located in either or both of the DFE 12 and the toner estimation component 52. Additionally, the DFE 12 stores print job information 22 in one or more print job queues 24, and executes a RIP algorithm on a selected print job. Raster information generated during the raster image processing is used by the processor 16 when estimating toner cost (e.g., to estimate toner coverage on one or more pages in a selected job. Additionally, the DFE comprises a job control dictionary, which is accessed to determine whether a user has requested a toner cost estimation report or summary.

It will be appreciated that the system 50 of FIG. 2, and the component thereof operate in a manner similar or identical to that described with regard to FIG. 1, and that the arrangement of the components is provided as an alternative arrangement to illustrate that toner estimation may be performed externally to the DFE.

Figure 3:
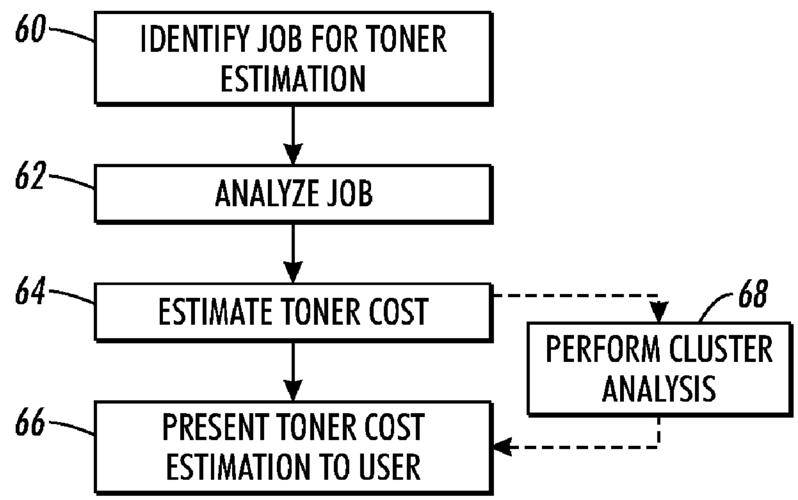
FIG. 3 illustrates a method of estimating toner cost for a print job and reporting estimated toner cost information to a user, in accordance with various aspects set forth herein.

FIG. 3 illustrates a method of estimating toner cost for a print job and reporting estimated toner cost information to a user, in accordance with various aspects set forth herein. At 60, toner cost estimation is invoked for a print job. For instance, a job is identified for cost estimation. Identification of the job is performed either at the queue level or via a job ticket. All queue properties are maintained as though the job were being printed, with the optional exceptions of resolution, and job sub-setting, which may be adjusted by a user. In an example in which the customer knows that the job has an N page cycle (every Nth page is similar in coverage), where N is an integer, the customer can select a subset of a small multiple of N pages. The customer may opt to print the job at this time or at a subsequent time, since cost estimation can be performed with or without printing.

At 62, the job is analyzed to collect information used for toner estimation. For instance, the job passes through a queuing system and raster imaging processing is performed thereon. Additionally, a job control dictionary is consulted to determine that cost estimation is selected.

At 64, the toner cost of the job is estimated based on the rasters generated during raster image processing. The rasters are generated in device color space, as determined by the current rendering mode. Estimates are generated on a page by page basis. For instance, raster image processing is performed or simulated at a selected resolution, which may be a function of the rendering mode(s) for the page(s) in the print job. Since different rendering modes are employed for different image objects (e.g., photographs, graphics, business graphics, text etc.), toner consumption for each rendering mode can be determined. In one example, a lookup table is accessed to determine an amount of toner consumed when printing the rasters generated or simulated during raster image processing in a given rendering mode, and a cost function is applied to estimate the toner cost of the print job.

At 66, toner cost estimate information is presented to the user. For instance, a single summary of the entire job may be presented to the user giving one or more of pages consumed, toner consumed, binding material consumed, etc. Additionally or alternatively, information for each page is presented on a page by page basis. Still furthermore, the information for representative pages may be presented. The information is displayed on a user interface, printed on a sheet of paper, and/or transmitted electronically to the user.

In another embodiment, the method includes estimating toner costs page-by-page or using representative pages, and the information is displayed to the user either as by page number(s) or as thumbnails of the pages themselves. If the estimation information is transmitted electronically to the user, it may be in a form readily converted to a spreadsheet or added to a database.

In another embodiment, the cost estimates for all of the pages for each of the separations are calculated, and cluster analysis is performed, at 68, either on the overall page cost or on the per-separation page cost (e.g., a toner cost associated with each color separation, such as CMYK separations, CMYKGOV separations, etc.). A cluster has associated with it all of the pages (page numbers and/or images) that have a similar cost. In one sense, clusters may be viewed as bins, into which pages and/or image objects are separated depending on their toner cost. A cost estimation report presented to a user at 66 may include a thumbnail of a page from each cluster (along with the cost per page and number of pages in that cluster), the page number of a representative page along with the cost per page a number of pages, etc. The report may be printed and/or converted to a viewable form and stored and/or transmitted to the user. Print jobs typically have few enough clusters that recognizable thumbnails along with the pertinent cost information can be printed on one page.

Figure 4:
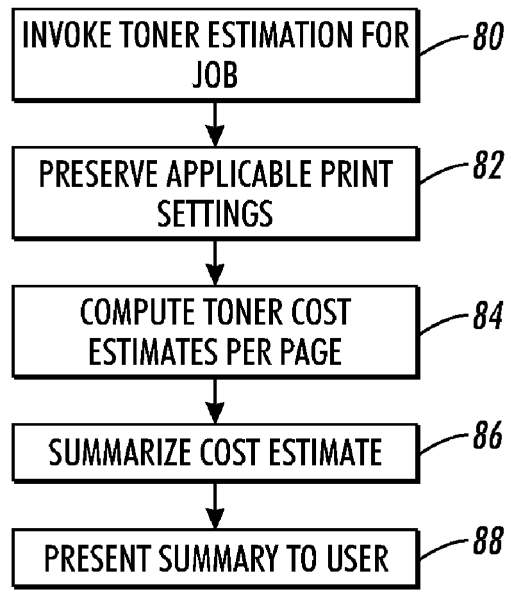
FIG. 4 illustrates a method of estimating toner cost for a print job, and reporting toner cost estimation information to a user, in accordance with various aspects set forth herein.

FIG. 4 illustrates a method of estimating toner cost for a print job, and reporting toner cost estimation information to a user, in accordance with various aspects set forth herein. At 80, toner estimation is invoked for a print job. At 82, all print settings that would otherwise apply during printing of the job are preserved. At 84, cost estimates are computed on a page by page basis. The cost estimate is summarized in a report at 86. The report is presented to the user at 88. Optionally, the print settings include at least one of color rendering mode, and subset printing parameters that are used to estimate toner consumption.

For example, toner estimation can be performed by analyzing image objects, and/or associated rendering modes therefor, on a page. Different rendering modes, rendering resolutions, and image objects require different amounts of toner, and such information is stored to a lookup table. When computing toner costs for a page, the print settings preserved at 82 are analyzed (e.g., through a simulated or actual raster of the page), and the simulated or generated rasters are assessed (e.g., via a table lookup) in conjunction with rendering mode, rendering resolution, etc. During cost estimation, the lookup table is accessed to estimate an amount of toner required for the page as a function of the rasters generated therefor, the rendering mode and resolution and any other available job parameter information germane to toner requirements.

In another embodiment, subset printing parameters (e.g., user selection of multiples of N pages) such as are described with regard to FIG. 3 are employed to estimate toner consumption.

Additionally, the method may employ cluster analysis to reduce the amount of information to a useful subset, and the various means of presentation, and selection of estimation independent of printing.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of estimating toner consumption by a printer, comprising:

identifying a print job for which toner cost estimation is desired;

analyzing the identified print job to identify print job parameters;

performing raster image processing on the print job, as a function of the identified print job parameters;

estimating toner cost for the print job as a function of raster information generated during raster image processing;

summarizing toner cost estimation information in a toner cost estimation report; and presenting the report to a user;

wherein estimating toner cost further comprises allowing a user to indicate a job sub-setting that includes a user-selected multiple of N pages, where N is an integer greater than zero, and the identified job has a job cycle of N pages, where every Nth page requires a similar amount of toner coverage amount.

2. The method of claim 1, further comprising identifying the print job at one or more of a print job queue level and via a job ticket.

3. The method of claim 1, wherein estimating toner cost further comprises allowing a user to indicate a rendering resolution at which the job will be printed.

4. The method of claim 3, wherein raster image processing is performed as a function of a rendering mode print job parameter for pages in the print job.

5. The method of claim 3, and wherein different rendering modes are employed for each of image objects, text objects, photographic objects, graphic objects, and business graphics or logos on the pages in the print job.

6. The method of claim 3, further comprising performing a table lookup to determine an amount of toner required for each page as a function of one or more rendering modes, one or more rendering resolutions, and one or more job sub-settings.

7. The method of claim 1, further comprising including in the report information describing at least one of:

a number of pages used in the print job, an amount of toner consumed during the print job, and an amount of binding material consumed, to give a total print job cost estimate;

estimated toner cost per page; and estimated toner cost for one or more representative pages, wherein each representative page toner cost is representative of one or more pages in the job.

8. The method of claim 1, wherein presenting the report to the user comprises one or more of:

displaying the report to the user on a user interface;

printing the report for user review; and electronically transmitting the report to a user-selected device.

9. The method of claim 8, wherein, when presenting the report to the user comprises electronically transmitting the report to the user-selected device, the user-selected device is one or more of a personal computer, a laptop, a cellular phone, a smartphone, a personal desktop assistant (PDA), or a personal communication device.

10. The method of claim 1, further comprising estimating toner cost for the print job on a page by page basis.

11. The method of claim 1, wherein estimating toner cost is performed without printing the print job.

12. The method of claim 1:

wherein estimating toner cost for the print job comprises clustering pages according to an estimated amount of toner coverage on the respective pages, where pages with similar amounts of estimated toner coverage are clustered together;

wherein the report includes a representative page from each of a plurality of clusters, and the number of pages in each cluster; and wherein the representative page is represented by at east one of its page number and a thumbnail of the representative page.

13. The method of claim 12, wherein the clustering is performed as a function of one or more of page cost and per-separation page cost.

14. A toner cost estimation system, comprising:

a memory that stores computer-executable instructions for:

identifying a print job for which toner cost estimation is desired, from one or more of a print job queue and a job ticket;

analyzing the identified print job to identify print job parameters;

performing raster image processing on the print job as a function of the identified print job parameters;

estimating per-page toner cost for the print job as a function of raster information generated during raster image processing;

summarizing the toner cost estimation in a toner cost estimation report; and presenting the report to a user; and a processor that executes the instructions; and a graphical user interface (GUI) whereby information is presented to a user;

wherein the memory stores, and the processor executes, computer-executable instructions for prompting a user to indicate a job sub-setting that includes a multiple of N pages, where N is an integer greater than zero, and the identified job has a lob cycle of N pages, where every Nth page requires a similar amount of toner coverage amount.

15. The system of claim 14, wherein the report comprises at least one of:

a number of pages used in the print job, an amount of toner consumed during the print job, and an amount of binding material consumed, to give a total print job cost estimate;

estimated toner cost per page; and estimated toner cost for one or more representative pages, wherein each representative page toner cost is representative of one or more non-representative pages.

16. The system of claim 14, wherein the report is presented to the user by one or more of:

displaying the report to the user on the (GUI);

printing the report for user review; and electronically transmitting the report to a user-selected device comprising one or more of a personal computer, a laptop, a cellular phone, a smartphone, a personal desktop assistant (PDA), or a personal communication device.

17. The system of claim 14:

wherein the memory stores, and the processor executes, computer-executable instructions for clustering pages according to an estimated amount of toner coverage on the respective pages, where pages with a similar estimated amount of toner coverage are clustered together;

wherein the report includes a representative page from each of a plurality of clusters, and the number of pages in each cluster; and wherein the representative page is represented in the report by at least one of its page number and a thumbnail of the representative page.

18. The system of claim 1, wherein the memory stores, and the processor executes, computer-executable instructions for:

prompting a user to indicate a rendering resolution at which the job will be printed;

performing the raster image processing as a function of a rendering mode print job parameter for pages in the print job, and wherein different rendering modes are employed for each of image objects, text objects, photographic objects, graphic objects, and business graphics or logos on the pages in the print job; and performing a table lookup to determine an amount of toner required for each page as a function of one or more rendering modes, one or more rendering resolutions, and one or more job sub-settings.

19. The system of claim 14, wherein toner cost estimation is performed without printing the print job.

20. An apparatus for estimating toner cost for a print job, comprising:

means for identifying a print job for which toner cost estimation is desired;

means for analyzing the selected print job to identify print job parameters including rendering resolution, rendering mode, and number of pages in the print job;

means for performing raster image processing on the print job to generate raster information as a function of the identified print job parameters;

means for estimating toner cost on a per page basis for the print job as a function of the raster information;

means for summarizing toner cost estimation information in a toner cost estimation report; and means for presenting the report to a user;

wherein the means for estimating toner cost allows a user to indicate a job sub-setting that includes a user-selected multiple of N pages, where N is an integer greater than zero, and the identified job has a job cycle of N pages, where every Nth page requires a similar amount of toner coverage amount.

* * * * *